US012665220B2

(12) United States Patent (10) Patent No.: US 12,665,220 B2
Lin et al. (45) Date of Patent: Jun. 23, 2026

(54) METHOD OF FORMING SOLID-STATE ELECTROLYTE POWDER

(71) Applicants: HON HAI PRECISION INDUSTRY CO., LTD., New Taipei City (TW); SolidEdge Solution Inc., Hsinchu City (TW)

(72) Inventors: Cheng-Ting Lin, Hsinchu City (TW); Hong-Zheng Lai, Hsinchu City (TW); Tseng-Lung Chang, Hsinchu City (TW); Yu-Han Li, Hsinchu City (TW)

(73) Assignees: HON HAI PRECISION INDUSTRY CO., LTD., New Taipei City (TW); SolidEdge Solution Inc., Hsinchu City (TW)

( * ) Notice: Subject to any disclaimer, the term of this patent is extended or adjusted under 35 U.S.C. 154(b) by 496 days.

(21) Appl. No.: 18/200,686

(22) Filed: May 23, 2023

(65) Prior Publication Data

US 2024/0243345 A1 Jul. 18, 2024

(30) Foreign Application Priority Data

Jan. 17, 2023 (TW) ................................. 112102123

(51) Int. Cl.
H01M 10/0562 (2010.01)
C01G 25/00 (2006.01)
(52) U.S. Cl.
CPC ...... H01M 10/0562 (2013.01); C01G 25/006 (2013.01); C01P 2002/50 (2013.01);
(Continued)

(58) Field of Classification Search
CPC ............ H01M 10/0565; H01M 10/058; C01G 25/006; Y02E 60/10
See application file for complete search history.

(56) References Cited

U.S. PATENT DOCUMENTS

2020/0083562 A1* 3/2020 Kim .................... H01M 50/431
2021/0214839 A1 7/2021 Pfenninger et al.
2022/0336847 A1* 10/2022 Ye .......................... C23C 16/40

FOREIGN PATENT DOCUMENTS

CN          105406114 A      3/2016
CN          110176627 A      8/2019
(Continued)

OTHER PUBLICATIONS

Machine translation of Wang (CN113328136), publication date Aug. 31, 2021.*
(Continued)

*Primary Examiner* — Jun Li
(74) *Attorney, Agent, or Firm* — CKC & Partners Co., LLC

(57) ABSTRACT

A method of forming a solid-state electrolyte powder includes the following steps. A zirconium compound layer is formed on an inner surface of a container. A precursor mixture is placed on the zirconium compound layer. The precursor mixture includes a first salt group and a second salt group. The first salt group includes zirconium source compound, lanthanum source compound, aluminum source compound, titanium source compound, tantalum source compound, or combinations thereof. The second salt group includes lithium source compound. An aerobic sintering process is performed to form the solid-state electrolyte powder.

18 Claims, 7 Drawing Sheets

(52) U.S. Cl.
CPC ...... *C01P 2002/72* (2013.01); *C01P 2002/82*
(2013.01); *C01P 2006/40* (2013.01); *H01M*
*2300/0071* (2013.01)

(56) References Cited

FOREIGN PATENT DOCUMENTS

| | | | | | |
|---|---|---|---|---|---|
| CN | 112209742 A | | 1/2021 | | |
| CN | 114784368 A | | 3/2021 | | |
| CN | 112768752 A | | 5/2021 | | |
| CN | 113224380 A | | 8/2021 | | |
| CN | 113328136 A | * | 8/2021 | ........ | H01M 10/0525 |
| CN | 113889661 A | * | 1/2022 | .......... | H01M 10/052 |
| CN | 113929447 A | | 1/2022 | | |
| CN | 113943151 A | | 1/2022 | | |
| CN | 112563566 A | | 7/2022 | | |
| CN | 115133114 A | | 9/2022 | | |
| CN | 115799615 A | * | 3/2023 | | |

OTHER PUBLICATIONS

Machine translation of Peng et al. (CN113943151), publication date
Jan. 18, 2022.*

* cited by examiner

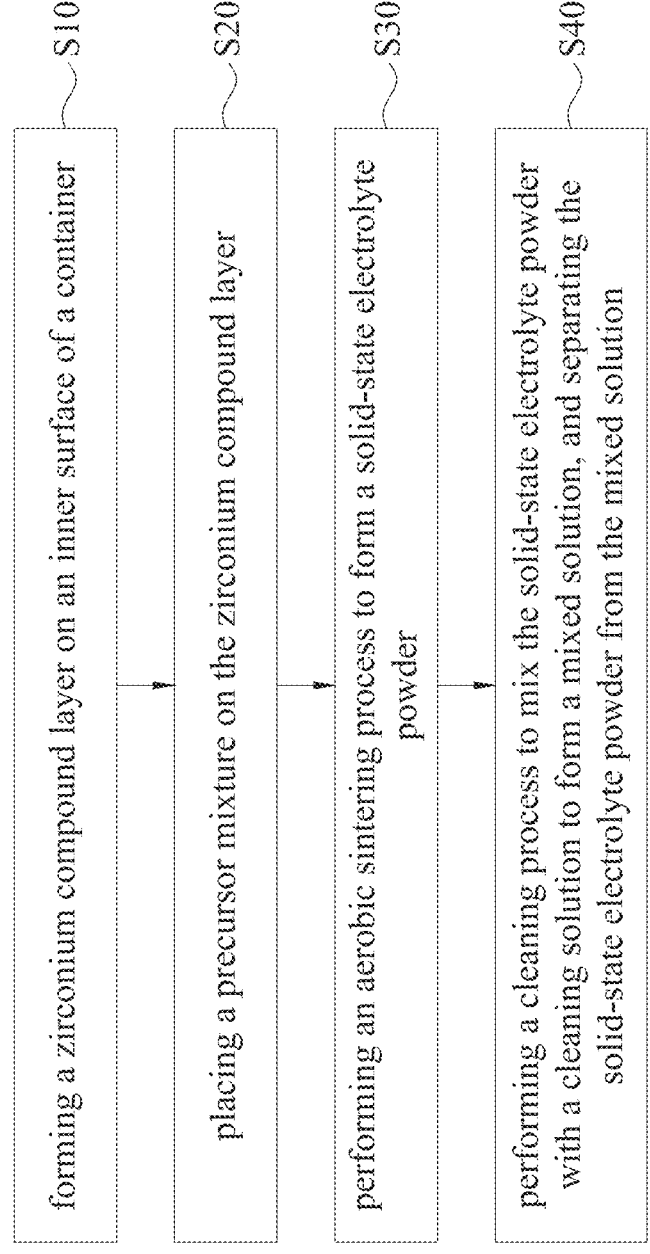

S10 forming a zirconium compound layer on an inner surface of a container

S20 placing a precursor mixture on the zirconium compound layer

S30 performing an aerobic sintering process to form a solid-state electrolyte powder

S40 performing a cleaning process to mix the solid-state electrolyte powder with a cleaning solution to form a mixed solution, and separating the solid-state electrolyte powder from the mixed solution

Fig. 1

20(degrees)

2θ(degrees)

METHOD OF FORMING SOLID-STATE ELECTROLYTE POWDER

CROSS-REFERENCE TO RELATED APPLICATION

This application claims priority to Taiwan Application Serial Number 112102123, filed Jan. 17, 2023, which is herein incorporated by reference in its entirety.

BACKGROUND

Field of Invention

The present disclosure relates to a method of forming a solid-state electrolyte powder.

Description of Related Art

Traditional lithium-ion batteries require a large amount of electrolyte to infiltrate the separator to achieve good ion channels, but the separator is susceptible to high temperature, which causes volume change and safety problems. Therefore, in recent years, commercial lithium batteries have gradually replaced traditional liquid electrolytes with solid-state electrolytes, such as in electric vehicles and energy storage systems with high safety requirements. Solid-state electrolytes cannot only improve the safety of batteries, but also have greater flexibility in the design of battery structures, and can effectively improve the energy density of batteries, thereby meeting the market demand.

At present, solid-state electrolytes can be divided into an inorganic ceramic solid-state electrolyte and a polymer electrolyte. Each has different ion conduction mechanisms. Among them, the inorganic ceramic solid-state electrolyte has good thermal and electrical stability and generally has good ionic conductivity. It is generally used in the form of pressed sheets and polymer-mixed thin films. However, the surface of the inorganic ceramic solid-state electrolyte powder is susceptible to oxidation to form an air passivation layer, which causes increased interface impedance and reduced cycling performance. Conventional machining methods for treating air passivation layers, such as grinding/polishing, cannot treat powders. Therefore, how to improve the air passivation layer on the surface of solid-state electrolyte powder is the emphasis of current industry research and development.

SUMMARY

The present disclosure provides a method of forming a solid-state electrolyte powder. The method includes the following steps. A zirconium compound layer is formed on an inner surface of a container. A precursor mixture is placed on the zirconium compound layer. The precursor mixture includes a first salt group and a second salt group. The first salt group includes zirconium source compound, lanthanum source compound, aluminum source compound, titanium source compound, tantalum source compound, or combinations thereof. The second salt group includes lithium source compound. An aerobic sintering process is performed to form the solid-state electrolyte powder.

In some embodiments, the zirconium compound layer includes zirconium dioxide, zirconium hydroxide, zirconium nitrate, zirconyl nitrate, zirconium hydrogen phosphate, zirconium tetrachloride, zirconium dichloride oxide, zirconium sulfate, or combinations thereof.

In some embodiments, a thickness of the zirconium compound layer is between 0.05 mm and 0.2 mm.

In some embodiments, forming the zirconium compound layer on the inner surface of the container includes the following steps. A zirconium compound coating is applied on the inner surface of the container. The zirconium compound coating is dried to form the zirconium compound layer, in which a drying temperature is between 40° C. and 120° C.

In some embodiments, a temperature of the aerobic sintering process is between 850° C. and 1280° C.

In some embodiments, the method further includes the following steps. After the aerobic sintering process is performed, a cleaning process is performed to mix the solid-state electrolyte powder with a cleaning solution to form a mixed solution, in which the cleaning solution includes an acid and an alcohol. The solid-state electrolyte powder is separated from the mixed solution.

In some embodiments, the acid includes an inorganic acid or an organic acid, the inorganic acid includes hydrochloric acid, phosphoric acid, sulfuric acid, nitric acid, boric acid, or combinations thereof, and the organic acid includes formic acid, acetic acid, or a combination thereof.

In some embodiments, the alcohol includes methanol, ethanol, isopropanol, or combinations thereof.

In some embodiments, the acid is hydrochloric acid, the alcohol is ethanol, and a concentration of the hydrochloric acid in the cleaning solution is between 0.1 wt % and 30 wt %.

In some embodiments, a solid content of the solid-state electrolyte powder in the mixed solution is between 1% and 50%.

The present disclosure provides a method of forming a solid-state electrolyte powder. The method includes the following steps. A precursor mixture is placed on a container, in which the precursor mixture includes a first salt group and a second salt group, the first salt group comprises zirconium source compound, lanthanum source compound, aluminum source compound, titanium source compound, tantalum source compound, or combinations thereof, and the second salt group comprises lithium source compound. A sintering process is performed. A cleaning process is performed with a cleaning solution, in which the cleaning solution includes an acid and an alcohol.

In some embodiments, performing the sintering process includes performing an anaerobic sintering process and performing an aerobic sintering process.

In some embodiments, a temperature of the anaerobic sintering process is between 800° C. and 1100° C.

In some embodiments, a temperature of the anaerobic sintering process is lower than a temperature of the aerobic sintering process.

In some embodiments, the method further includes the following steps. A zirconium compound layer is formed on the container before the precursor mixture is placed on the container.

The present disclosure provides a method of forming a solid-state electrolyte powder. The method includes the following steps. A zirconium compound layer is formed on an inner surface of a container. A grinding process is performed on a precursor mixture, in which the precursor mixture includes a first salt group and a second salt group, the first salt group includes zirconium source compound, lanthanum source compound, aluminum source compound, titanium source compound, tantalum source compound, or combinations thereof, and the second salt group includes lithium source compound. The precursor mixture is placed on the zirconium compound layer after the grinding process is performed. A sintering process is performed.

In some embodiment, based on 100 wt % of the precursor mixture, the first salt group is between 70 wt % and 78 wt %, and the second salt group is between 22 wt % and 30 wt %.

In some embodiment, the grinding process includes the following steps. The first salt group is ground. The first salt group and the second salt group are mixed after the first salt group is ground. The first salt group and the second salt group are ground.

In some embodiments, the method further includes the following steps. A cleaning process is performed with a solution of hydrochloric acid and an alcohol after the sintering process is performed.

In some embodiments, performing the sintering process includes performing an anaerobic sintering process and performing an aerobic sintering process.

These and other features, aspects, and advantages of the present disclosure will become better understood with reference to the following description and appended claims. It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows:

FIG. 1 is a method flowchart according to some embodiments of the present disclosure.

DETAILED DESCRIPTION

Figure 2A:
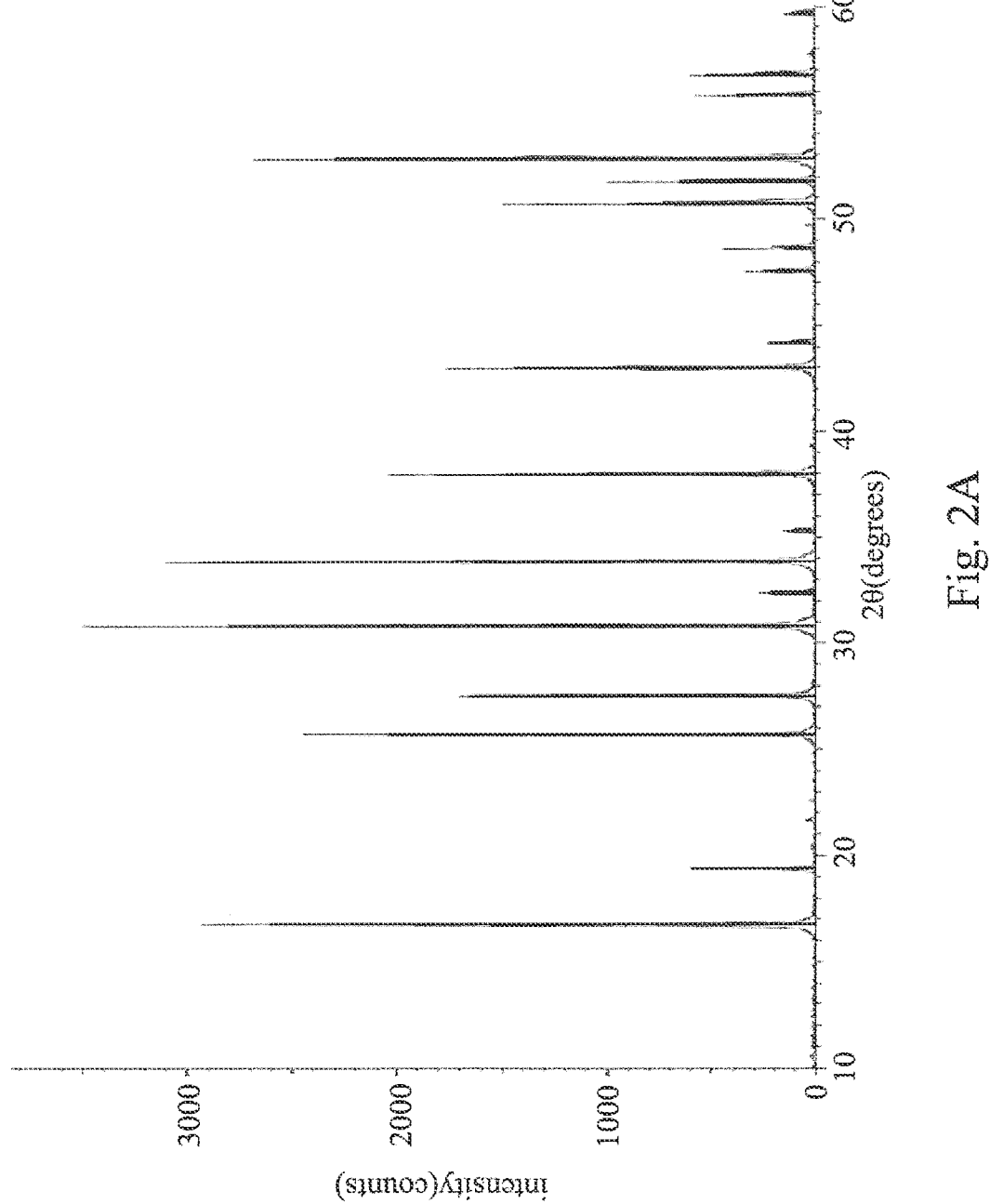
FIGS. 2A and 2B are X-ray diffraction (XRD) analysis spectra of solid-state electrolyte powder formed according to some embodiments of the present disclosure.

Herein, a range indicated by "one value to another value" is a general representation that avoids enumerating all values in the range in the specification. Therefore, the description of a specific numerical range covers any numerical value in the numerical range, and any numerical value bounds the smaller numerical range in the numerical range as if the arbitrary and smaller numerical ranges are expressly written in the specification.

As used herein, "about," "approximately," "essentially," or "essentially" includes the stated value and averages within acceptable deviations from the particular value as determined by one of ordinary skill in the art, taking into account the measurement in discussion and the specific amount of error associated with the measurement (i.e., the limitations of the measurement system). For example, "about" can mean within one or more standard deviations of the stated value, or for example within ±30%, ±20%, ±15%, ±10%, ±5%. Furthermore, the terms "about", "approximately", "essentially" or "substantially" used herein can select a more acceptable range of deviation or standard deviation according to measurement properties, coating properties, or other properties, and It is not necessary to apply one standard deviation to all properties.

In the method of forming solid-state electrolyte powder such as lithium lanthanum zirconium oxide (LLZO), lithium aluminum titanium phosphate, LATP), lithium lanthanum titanate (LLTO), lithium lanthanum zirconium tantalum oxide (LLZTO) etc., lithium, as a raw material for solid-state electrolytes, may lose due to the high temperature during the sintering process. Therefore, lithium is often added excessively in the raw materials formulation, resulting in residual lithium on the surface of the solid-state electrolyte powder after the sintering process. During the cooling process, this unreacted lithium may react with gases such as water vapor, carbon monoxide, and/or carbon dioxide in the air to form a passivation layer of lithium compounds, such as lithium carbonate, lithium oxide and/or lithium hydroxide. This passivation layer may cause interface impedance and lead to poor lithium ion conduction.

In light of the above, the present disclosure provides a method of forming a solid-state electrolyte powder. Before performing the aerobic sintering process, a zirconium compound layer is formed on an inner surface of the container that carries a precursor mixture. Zirconium has the characteristics of high-temperature resistance and high chemical stability, and can easily react with lithium. Therefore, the zirconium compound layer on this container can adsorb excess lithium during the sintering process to avoid unreacted lithium remaining on the surface of solid-state electrolyte powder. In addition, because of the low heat transfer coefficient of zirconium, the precursor mixtures in the container can be heated slowly and evenly. This prevents densification of the solid-state electrolyte powder surface due to rapid reaction from affecting the subsequent reaction to proceed. This zirconium compound layer does not stick to the sintered solid-state electrolyte powder, and thus can effectively help the solid-state electrolyte powder form a cubic crystal phase and improve ionic conductivity.

The present disclosure provides a method of forming a solid-state electrolyte powder. The method includes the following steps. A zirconium compound layer is formed on an inner surface of a container. A precursor mixture is placed on the zirconium compound layer. The precursor mixture includes a first salt group and a second salt group. The first salt group includes zirconium source compound, lanthanum source compound, aluminum source compound, titanium source compound, tantalum source compound, or combinations thereof. The second salt group includes lithium source compound. An aerobic sintering process is performed to form a solid-state electrolyte powder.

Please refer to FIG. 1. FIG. 1 is a method flowchart of forming solid-state electrolyte powder according to some embodiments of the present disclosure. The method includes a step S10 to a step S40, and the step S10 to the step S40 may be performed sequentially.

In the step S10 of FIG. 1, a zirconium compound layer is formed on an inner surface of the container. A zirconium compound layer can be formed by spraying or any coating method. In some embodiments, this step includes the following steps. A zirconium compound coating is applied on the inner surface of the container. The zirconium compound coating is dried to form the zirconium compound layer. A drying temperature is between 40° C. and 120° C., for example, 40, 50, 60 70, 80, 90, 100, 110, or 120° C. When the temperature is too high, the zirconium compound coating may crack due to poor adhesion. When the temperature is too low, the drying rate may be too slow, reducing the process efficiency. In some embodiments, drying is performed by using an oven, and the drying temperature is 80° C. In some embodiments, the zirconium compound layer includes zirconium dioxide ($ZrO_2$), zirconium hydroxide ($Zr(OH)_4$), zirconium nitrate ($Zr(NO_3)_4$), zirconyl nitrate ($ZrO(NO_3)_2$), zirconium hydrogen phosphate ($Zr(HPO_4)$), zirconium tetrachloride ($ZrCl_4$), zirconium dichloride oxide ($ZrOCl_2$), zirconium sulfate ($Zr(SO)_4$), or combinations thereof, but not limited thereto. In some embodiments, the zirconium compound layer is zirconium dioxide. In some embodiments, the thickness of the dried zirconium compound layer is between 0.05 mm and 0.2 mm, for example, 0.05, 0.1, 0.15, or 0.2 mm. When the thickness is too thin, the amount of zirconium compound may not be sufficient to react and remove the excess lithium. When the thickness is too thick, the container may conduct heat too slowly. In some embodiments, the material of the container (e.g., crucible) may be, for example, alumina, silicon oxide, zirconium dioxide, or other materials. If the container is made of zirconium dioxide and is not covered with a zirconium compound layer, when performing the process of forming solid-state electrolyte directly inside the container, the container may participate in the sintering process of solid-state electrolyte powder. There may be problems of cracking and damage after multiple uses. In some embodiments, the chosen material for the container and the zirconium compound coating is different.

In the step S20 of FIG. 1, a precursor mixture is placed on the zirconium compound layer. The precursor mixture includes a first salt group and a second salt group. The first salt group includes zirconium source compound, lanthanum source compound, aluminum source compound, titanium source compound, tantalum source compound, or combinations thereof. The second salt group includes lithium source compound. In some embodiments, the zirconium source compound may be, for example, zirconium dioxide ($ZrO_2$), zirconium hydroxide ($Zr(OH)_4$), zirconium nitrate ($Zr(NO_3)_4$), zirconyl nitrate ($ZrO(NO_3)_2$), zirconium hydrogen phosphate $Zr(HPO_4)$, zirconium tetrachloride ($ZrCl_4$), zirconium dichloride oxide ($ZrOCl_2$), zirconium sulfate ($Zr(SO)_4$), or combinations thereof, but not limited thereto. The lanthanum source compounds may be, for example, lanthanum oxide ($La_2O_3$), lanthanum hydroxide ($La(OH)_3$), or a combination thereof, but not limited thereto. The aluminum source compound may be, for example, aluminum oxide ($Al_2O_3$), but not limited thereto. The titanium source compounds may be, for example, titanium dioxide ($TiO_2$). The tantalum source compounds may be, for example, tantalum trioxide ($Ta_2O_3$), tantalum pentoxide ($Ta_2O_5$), or a combination thereof, but not limited thereto. The lithium source compounds may be, for example, lithium carbonate ($Li_2CO_3$), lithium hydroxide (LiOH), lithium nitrate ($LiNO_3$), or combinations thereof, but not limited thereto. In some embodiments, depending on the situation, the precursor mixture may further include a dopant, for example, a gallium source compound, such as gallium oxide ($Ga_2O_3$). In some embodiments, based on 100 wt % of the precursor mixture, the first salt group may be between 70 wt % and 78 wt %, and the second salt group may be between 22 wt % and 30 wt %. Therefore, it facilitates the formation of the expected crystal coordination structure of the solid-state electrolyte powder during the subsequent sintering process.

In the step S30 of FIG. 1, an aerobic sintering process is performed to form a solid-state electrolyte powder. In some embodiments, the temperature of the aerobic sintering process is between 850° C. and 1280° C., for example, 850, 900, 950, 1000, 1050, 1100, 1150, 1200, or 1280° C. In detail, when the temperature is too low, crystal densification may occur easily, and the crystal phase of the solid-state electrolyte tends to stay in the tetragonal crystal phase instead of the required cubic crystal phase. The tetragonal crystal phase may cause grain boundary obstruction and reduce ion conductivity. When the temperature is too high, it may lead to heterogeneous phases, which reduce ionic conductivity. In some embodiments, the heating rate is also a key factor that affects the formation of the desired cubic crystal phase of the solid-state electrolyte. Basically, the heating rate may be controlled to be no more than 5° C./min. When the heating rate is too fast, it may lead to heterogeneous phases. In some embodiments, the aerobic sintering temperature may be further adjusted according to the amount of the starting material (e.g., salt mixture) to improve coordination and phase transition yield. Specifically, the aerobic sintering temperature can be between 850° C. and 1000° C. when performing small batch reactions (e.g., starting with a salt mixture of about 10 kg). The aerobic sintering temperature can be between 1130° C. and 1280° C. when performing large batch reactions (e.g., starting with a salt mixture of about 50 kg). When dopants are present, the required sintering time may be longer and the sintering temperature may be higher. In some embodiments, the oxygen flow rate may be between 6 L/min and 40 L/min, in which the oxygen flow rate can be between 6 L/min and 10 L/min when performing small batch reactions (e.g., starting with a salt mixture of about 1-5 kg). The oxygen flow rate can be between 20 L/min to L/min when performing large batch reactions (e.g., starting with a salt mixture of about 10-50 kg). The sintering time required for the aerobic sintering process depends on the amount of powder to be sintered and the sintering temperature. In some embodiments, the holding time of the terminal temperature of the aerobic sintering process may be between 6 hours and 14 hours to ensure the formation of solid-state electrolyte powder and to avoid the generation of heterogeneous phases due to overreaction.

XRD spectrum is further used for verification as follows. It should be known that, in the XRD spectrum, the vertical axis represents the signal intensity, that is, the photon intensity. The unit of the signal intensity is counts. The horizontal axis represents the 2θ diffraction angle, that is, the angle between the extension of the incident X-ray and the reflected X-ray. The unit of the 2θ diffraction angle is degree.

Figure 2B:
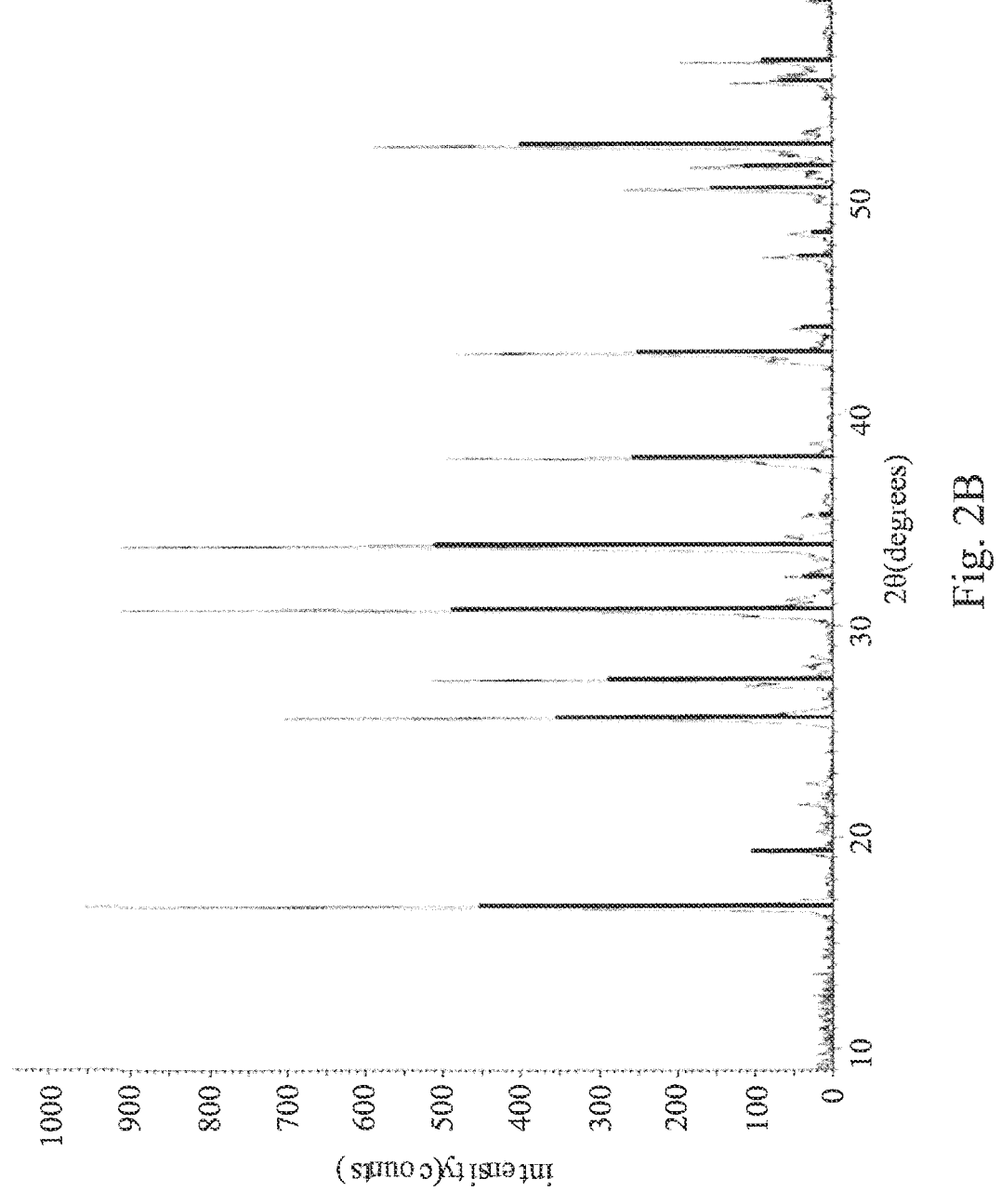

Please refer to FIG. 2A and FIG. 2B at the same time. In the following, the solid-state electrolyte powder is formed according to some embodiments of the present disclosure. The detailed method is as follows. An inner surface of a crucible was coated with a thickness of about 0.1 mm of zirconium dioxide. It was dried at 80° C. to form a zirconium dioxide layer. A precursor mixture of LLZO was placed on the zirconium dioxide layer. An aerobic sintering process was performed at 1000° C. for 12 hours to form LLZO. A crystal phase composition of LLZO was then analyzed by XRD. The measured XRD spectrum is shown in FIG. 2A. In addition, a crucible (made of alumina) without a zirconium dioxide layer coated was used to form LLZO in the same manner. The measured XRD spectrum is shown in FIG. 2B. As can be seen from FIG. 2A, LLZO formed by using a crucible with a zirconium dioxide layer coated has high purity of cubic crystal phase. As can be seen from FIG. 2B, LLZO formed by using a crucible without a zirconium dioxide layer coated contains a large number of tetragonal crystal phases and a small number of cubic crystal phases. In other words, in the present disclosure, the formation of a zirconium compound layer on the inner surface of the container allows the precursor mixture to be heated uniformly during the aerobic sintering process. The surface densification which affects the reaction can be avoided. The proportion of cubic crystal phase is increased, thereby reducing the grain boundary obstruction, and increasing the ionic conductivity of solid-state electrolyte powder.

Figure 2C:
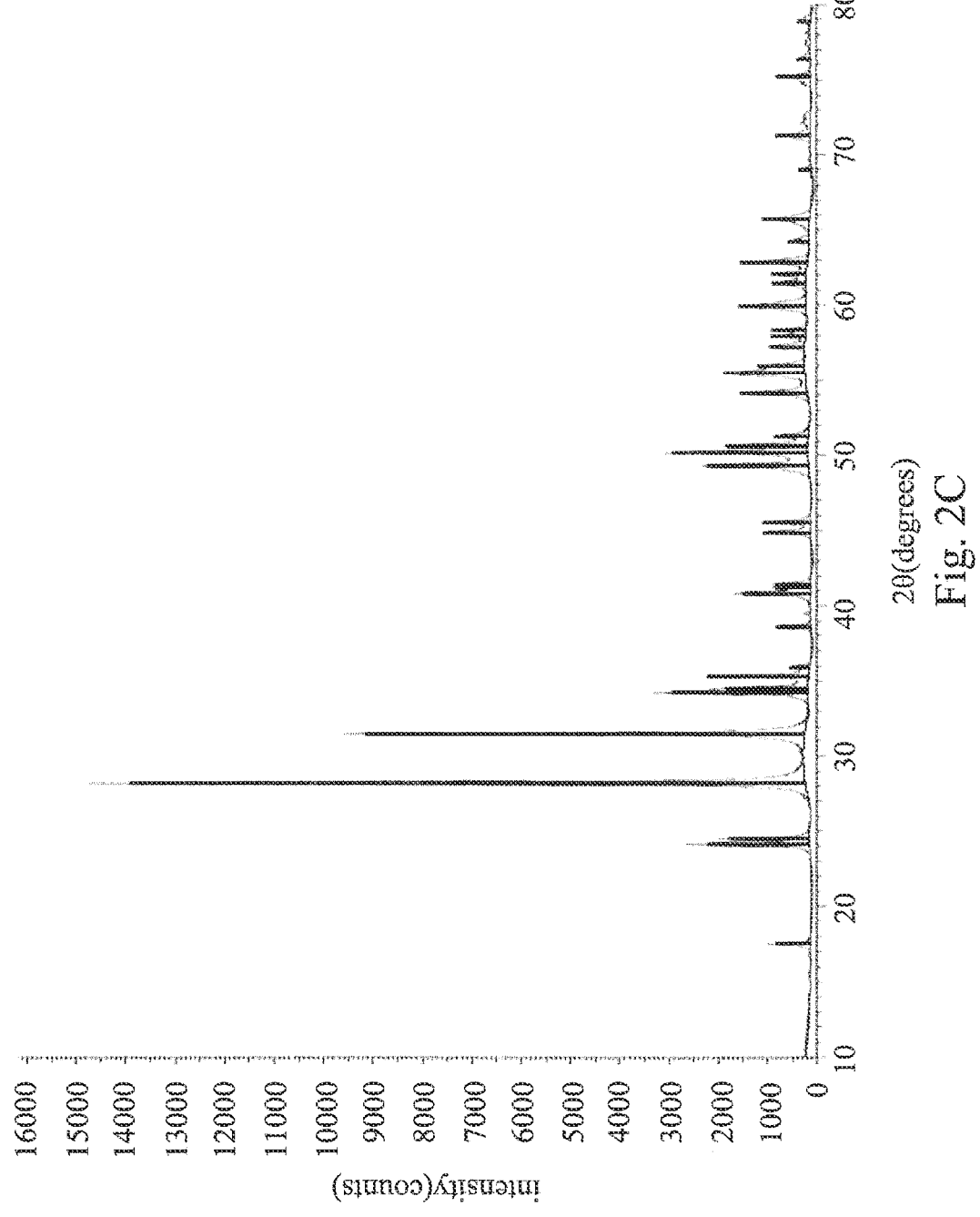
FIGS. 2C and 2D are XRD spectrum of the zirconium compound layer formed according to some embodiments of the present disclosure.
Figure 2D:
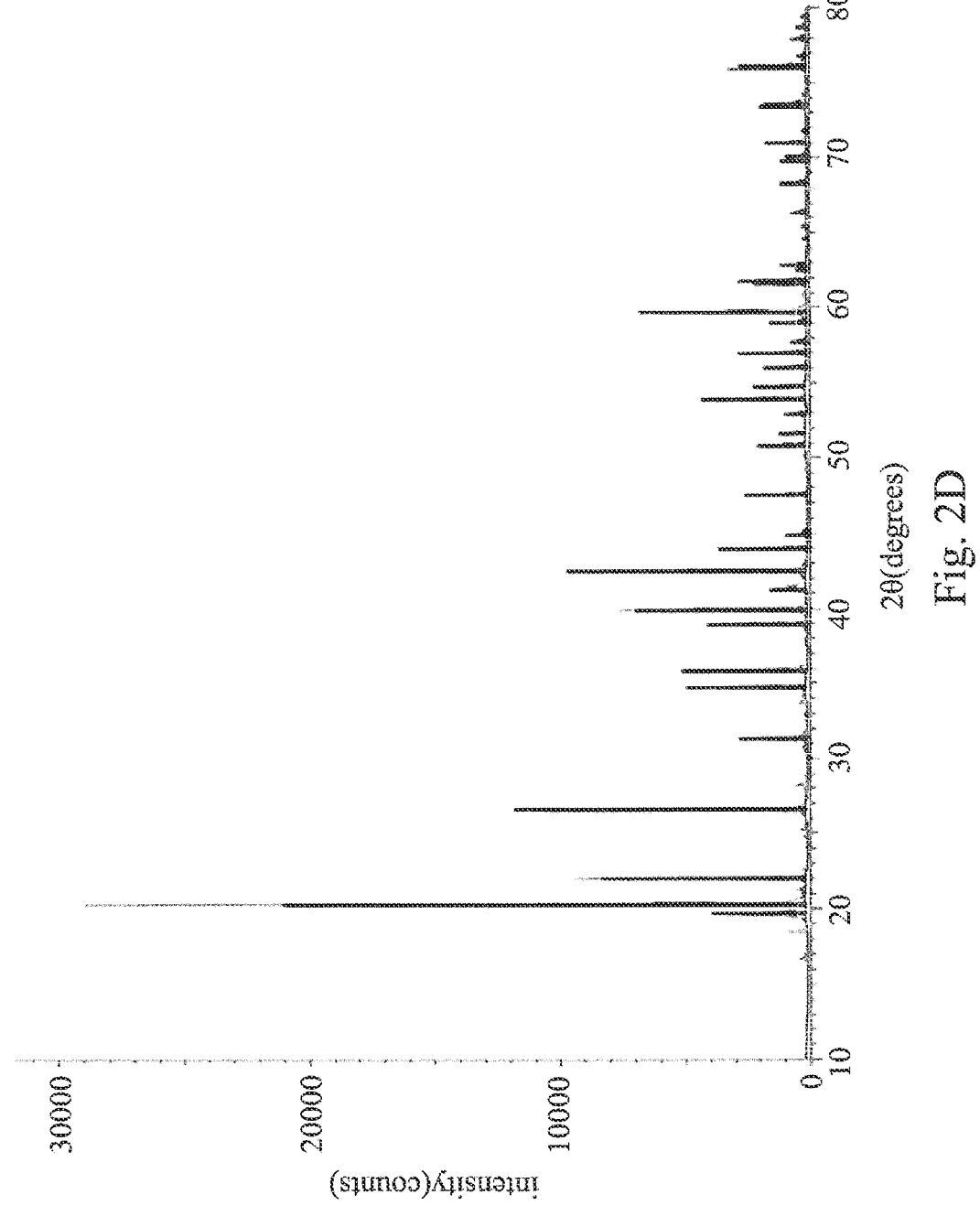

Please refer to FIG. 2C and FIG. 2D at the same time. In the following, the solid-state electrolyte powder is formed according to some embodiments of the present disclosure. The detailed method is as follows. An inner surface of a crucible was coated with a thickness of about 0.1 mm of zirconium dioxide. It was dried at 80° C. to form a zirconium dioxide layer. A crystal phase composition of the zirconium dioxide layer was then analyzed by XRD (see FIG. 2C). A precursor mixture of LLZO was placed on the zirconium dioxide layer. An aerobic sintering process was performed at 1000° C. for 12 hours to form LLZO. A crystal phase composition of the zirconium dioxide layer was analyzed by XRD (see FIG. 2D). As shown in FIG. 2C, before the aerobic sintering process, only signals of zirconium dioxide ($ZrO_2$) are present in the XRD spectrum. As shown in FIG. 2D, after the aerobic sintering process, signals of lithium zirconate ($Li_2ZrO_3$) are visible in the XRD spectrum. This indicates that the zirconium dioxide layer on the crucible reacts with excess unreacted lithium on the surface of LLZO to form lithium zirconate. In other words, in the present disclosure, a zirconium compound layer is formed on the inner surface of the container, followed by an aerobic sintering process. The zirconium compound layer can react with excess lithium on the surface of solid-state electrolyte powder, which avoids excess lithium contacting with air to form a passivation layer subsequently, and therefore ionic conductivity of solid-state electrolyte powder can be improved.

After the solid-state electrolyte powder is formed, once it leaves the inert atmosphere of the sintering process, it reacts easily with water vapor, carbon monoxide, or carbon dioxide in the air and forms a passivation layer of lithium compounds such as lithium carbonate, lithium oxide, lithium hydroxide, etc. Among them, the lithium carbonate is the most intractable. Because the lithium carbonate is only soluble in water and is insoluble in organic solvents, the lithium carbonate cannot be removed by organic solutions. Water easily destroys the crystalline phase of the solid-state electrolyte powder and reduces its ionic conductivity.

In light of the above, the present disclosure provides a method of forming a solid-state electrolyte powder. After performing the aerobic sintering process, the solid-state electrolyte powder is cleaned with a cleaning solution. Lithium carbonate is acidified by acid to form lithium compounds that are easier to be dissociated (e.g., lithium carbonate reacts with hydrochloric acid to form lithium chloride). The easily dissociated lithium compounds are then dissolved in organic solvents. This method can effectively dissolve and remove the passivation layer on the surface of solid-state electrolyte powder. In addition, after the solid-state electrolyte powder is cleaned by a cleaning solution, a protonated protective layer (e.g., $Li_{(7-f)}$ $H_fLa_3Zr_2O_{12}$, f is 1~7) may be formed on the surface of the solid-state electrolyte powder, and may not form a passivation layer in the air. Later, when the solid-state electrolyte powder is put into the battery and contact with lithium ions, the protons of the surface protonated protective layer may exchange with lithium ions and react to form a solid-state electrolyte powder with the correct coordination number (e.g. $Li_7La_3Zr_2O_{12}$) to achieve good ionic conductivity.

In the step S40 of FIG. 1, after performing the aerobic sintering process, a cleaning process is performed to mix the solid-state electrolyte powder with a cleaning solution to form a mixed solution. The cleaning solution includes acids and alcohols. The solid-state electrolyte powder is separated from the mixed solution. In some embodiments, the acid includes an inorganic acid or an organic acid. The inorganic acid includes hydrochloric acid (HCl), phosphoric acid ($H_3PO_4$), sulfuric acid ($H_2SO_4$), nitric acid ($HNO_3$), boric acid ($H_3BO_3$), or combinations thereof. The organic acid includes formic acid (HCOOH), acetic acid ($COOHCH_3COOH$), or a combination thereof. In some embodiments, the alcohol includes methanol ($CH_3OH$), ethanol ($C_2H_5OH$), isopropanol ($C_3H_7OH$), or combinations thereof. In some embodiments, anhydrous alcohols may be used to avoid water from reacting with solid-state electrolyte powder, which destroys its crystal phase. In some embodiments, the solid-state electrolyte powder and cleaning solution may be mixed by magnet stirring and ultrasonic vibration, and the mixing time may be between 10 minutes and 60 minutes. It can be adjusted according to the solid content of the solid-state electrolyte powder in the mixed solution and the concentration of the acid in the cleaning solution. In some embodiments, the acid is hydrochloric acid and the alcohol is ethanol. The hydrochloric acid concentration in the cleaning solution is between 0.1 wt % and 30 wt %, for example, 0.1, 0.5, 1, 5, 10, 15, 20, 25, or 30 wt %. When the hydrochloric acid concentration in the cleaning solution is too high, it may destroy solid-state electrolyte powder. When the hydrochloric acid concentration in the cleaning solution is too low, the effect of dissolving lithium carbonate may be poor. In some embodiments, the cleaning time may be increased at a lower concentration, such as cleaning for 30 minutes at a concentration of 10 wt %, or cleaning for 15 minutes at a concentration of 20 wt %, which are the better solutions for the process. In some embodiments, the solid content of the solid-state electrolyte powder in the mixed solution is between 1% and 50%, for example, 1, 5, 10, 20, 30, 40, or 50%. When the solid content is too high, it may cause uneven mixing. When the solid content is too low, the cleaning efficiency is slower. In some embodiments, the solid-state electrolyte powder may be separated from the mixed solution by extraction filtration or centrifugal equipment. The separated solid-state electrolyte powder may be dried by a vacuum oven.

Raman spectrum is further used for verification as follows. It should be known that in the Raman spectrum, the horizontal axis represents the Raman shift, that is, the line shift of Raman scattering, which is in unit $cm^{-1}$. The vertical axis represents the signal intensity, which is in arbitrary units (a.u.).

Figure 3A:
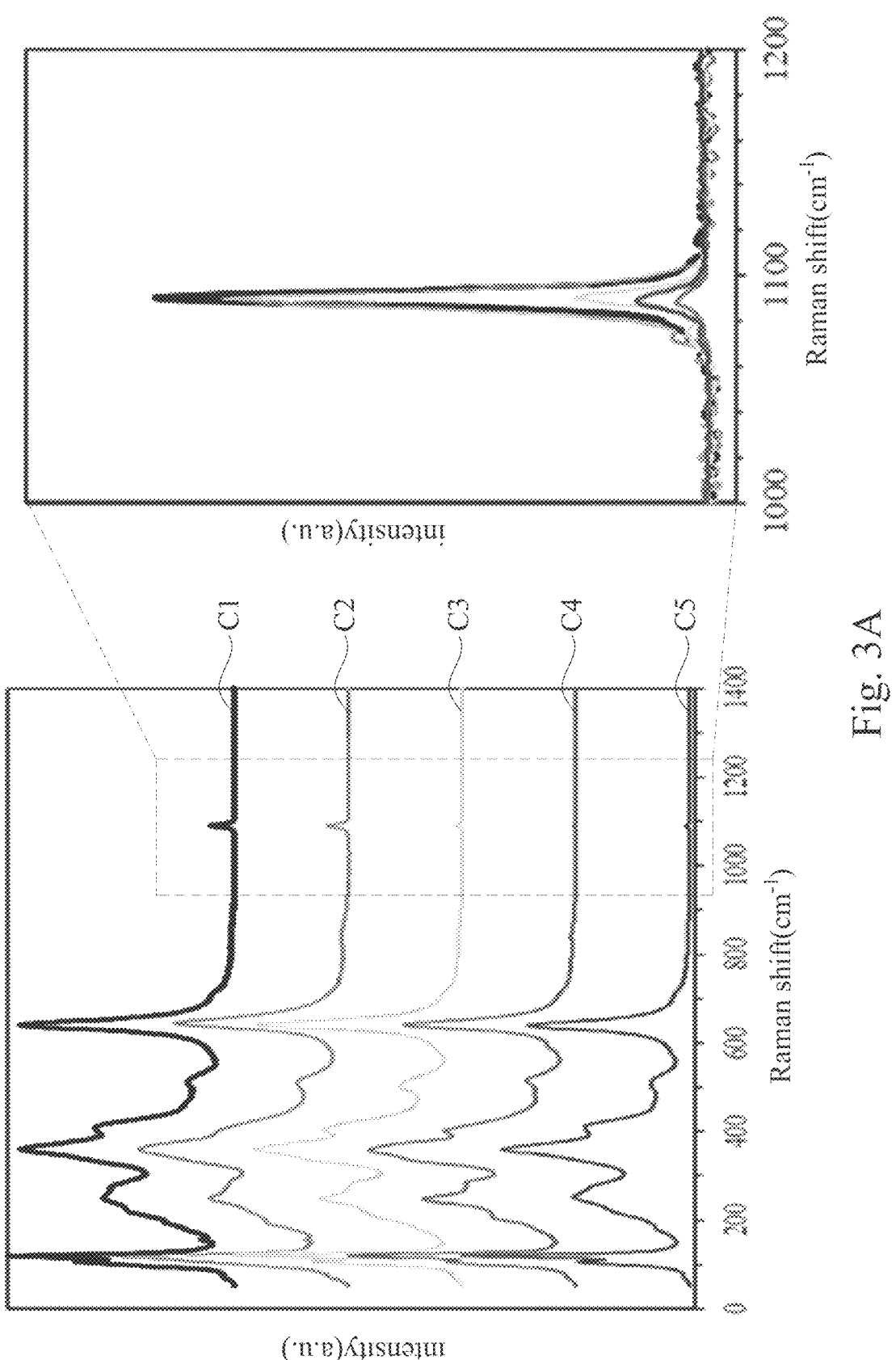
FIGS. 3A and 3B are Raman spectroscopy of solid-state electrolyte powder formed after the cleaning process according to some embodiments of the present disclosure.
Figure 3B:
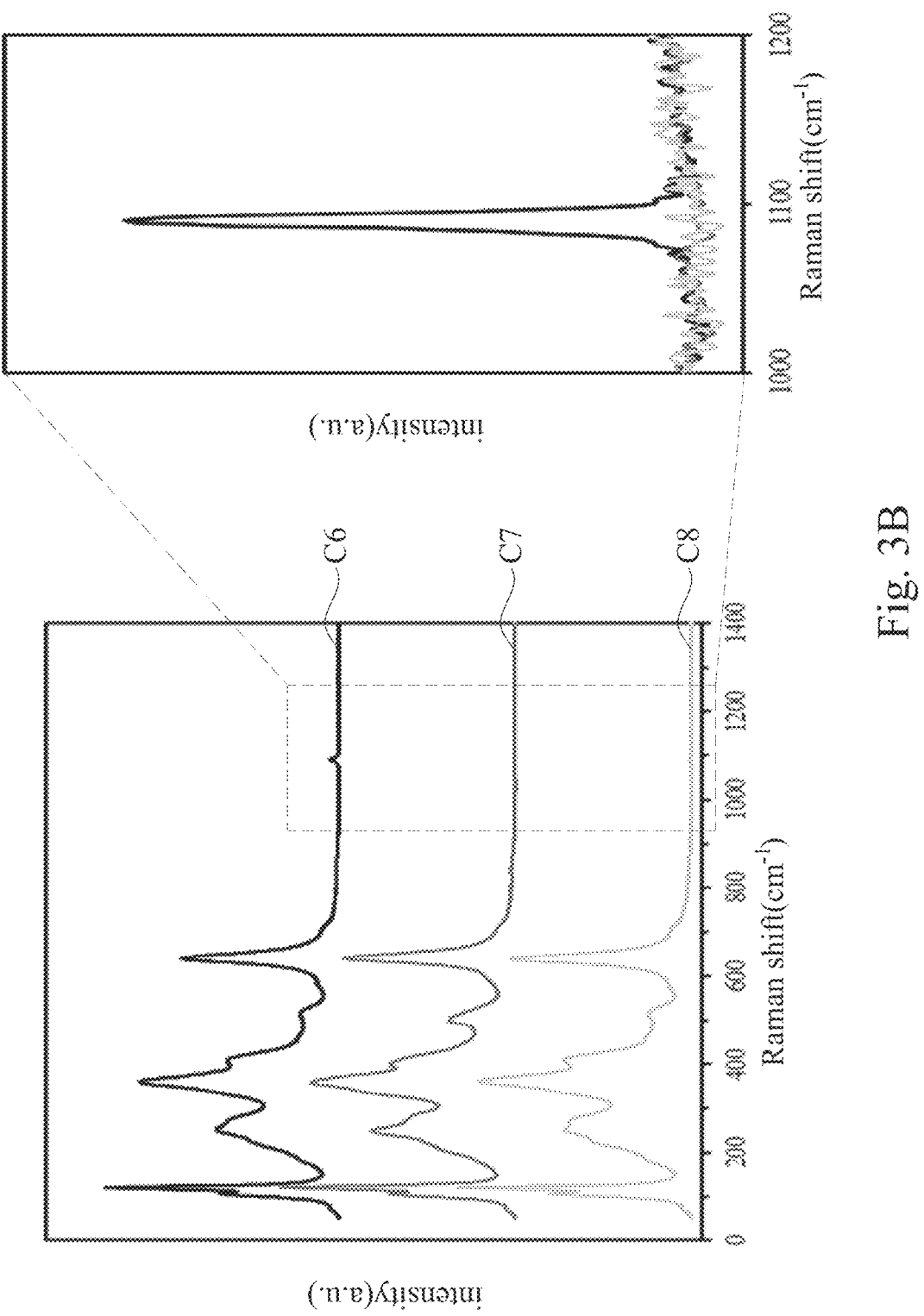

Please refer to FIG. 3A and FIG. 3B at the same time. In the following, the solid-state electrolyte powder is formed according to some embodiments of the present disclosure. The detailed method is as follows. An inner surface of a crucible was coated with a thickness of about 0.1 mm of zirconium dioxide. It was dried at 80° C. to form a zirconium dioxide layer. A precursor mixture of LLZO was placed on the zirconium dioxide layer. An aerobic sintering process was performed at 1000° C. for 12 hours to form LLZO. A cleaning process was then performed. The cleaning process steps are as follows. Different hydrochloric acid concentrations of hydrochloric acid/ethanol cleaning solutions are prepared separately. LLZO is mixed with a cleaning solution to form a mixed solution with a solid content of 30%. The mixed solution was stirred by a magnet and was shaken with ultrasound for 15 minutes, respectively. LLZO was separated from the mixed solution by using an extraction filtration and was placed in a vacuum oven to dry. The chemical composition of LLZO was then analyzed by the Raman spectrum.

Please refer to FIG. 3A, curves C1, C2, C3, C4 and C5 respectively represent spectra of LLZO after being cleaned with hydrochloric acid/ethanol cleaning solution, in which the hydrochloric acid concentrations are 0.1 wt %, 0.5 wt %, 1.0 wt %, 5.0 wt %, and 10 wt %. As can be seen from FIG. 3A, the signal intensity of lithium carbonate (located between 1000 cm$^{-1}$ and 1150 cm$^{-1}$) in the passivation layer on the surface of LLZO decreases with the increase of hydrochloric acid concentration of the cleaning solution. In other words, in the present disclosure, cleaning solid-state electrolyte powder with a cleaning solution can effectively remove the passivation layer on its surface, thereby improving the ionic conductivity of solid-state electrolyte powder.

Please refer to FIG. 3B, curves C6, C7 and C8 respectively represent spectra of LLZO after being cleaned with hydrochloric acid/ethanol cleaning solution, in which the hydrochloric acid concentrations are 0 wt %, 20 wt %, and 30 wt %. As can be seen from FIG. 3B, the signal intensity of lithium carbonate in the passivation layer on the surface of LLZO decreases to almost no signal with the increase of hydrochloric acid concentration of the cleaning solution. In other words, in the present disclosure, cleaning solid-state electrolyte powder with a cleaning solution can effectively remove the passivation layer on its surface, thereby improving the ionic conductivity of solid-state electrolyte powder.

In some embodiments, an anaerobic sintering process may be performed before performing the aerobic sintering process disclosed herein. In detail, the solid-state electrolyte powder process can be a two-stage sintering process, which is performed separately in an anaerobic and aerobic environment. Firstly, an anaerobic sintering process is performed on the precursor mixture before the mentioned step S10. After, the above step S10 to step S40 are then performed. In this way, it can provide stable quantitative-level processes and save process costs, increase process yield, and improve the quality of solid-state electrolyte powder formed, in which the anaerobic sintering process temperature can be between 800° C. and 1100° C., preferably between 900° C. and 980° C. Thus the precursor mixture can form precursors first (e.g., forming LZO, a precursor of the solid-state electrolyte powder LLZO), which increases phase formation yield. In detail, when the sintering temperature is too low, the energy may not be enough to form a precursor. When the sintering temperature is too high, it may lead to the generation of heterogeneous phases, which is not beneficial to the subsequent formation of solid-state electrolyte powder. In addition, the anaerobic sintering process time depends on the amount of sintering powder and the sintering temperature. In some embodiments, the anaerobic sintering process time may be between 10 hours and 16 hours to ensure that the precursor mixtures are really converted to precursors and avoid the generation of heterogeneous phases due to over-reaction.

In some embodiments, before performing the aerobic sintering process disclosed herein, a grinding process may be performed to refine and uniformly disperse the precursor mixture. It improves the coordination accuracy in the subsequent sintering process. A coordinated crystal structure with the expected crystal powder can be formed. In addition, the ground precursor mixture with uniform and small particle size can increase its specific surface area. It has a higher reaction rate in the subsequent sintering process, which saves time of the sintering process. In some embodiments, the grinding process may be performed separately before performing the aerobic sintering process and the anaerobic sintering process of the two-stage sintering process. In some embodiments, the grinding process can be divided into a two-stage grinding step of a front stage and a later stage. After the first salt group with a larger average particle size or higher hardness is preliminarily refined in the front stage of the grinding step, the later stage of the grinding step is carried out together with the second salt group with a smaller average particle size or lower hardness. In some embodiments, the grinding process may include a wet grinding process, a dry grinding process, or a combination thereof, and can be alternated with each other.

Given the above, the present disclosure provides a method of forming a solid-state electrolyte powder. Before performing the aerobic sintering process, a zirconium compound layer is formed on an inner surface of a container that carries the precursor mixture. The zirconium compound layer on the container adsorbs the excess lithium during the sintering process. It prevents the unreacted lithium remaining on the surface of solid-state electrolyte powder from contacting the air and forming a passivation layer subsequently. In addition, after the aerobic sintering process, a cleaning process can be performed to clean the solid-state electrolyte powder with a cleaning solution to remove the passivation layer on its surface. The method disclosed above can effectively improve the ionic conductivity of solid-state electrolyte powder.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A method of forming a solid-state electrolyte powder, comprising:

forming a zirconium compound layer on an inner surface of a container, wherein a thickness of the zirconium compound layer is between 0.05 mm and 0.2 mm;

placing a precursor mixture on the zirconium compound layer, wherein the precursor mixture comprises a first salt group and a second salt group, the first salt group comprises zirconium source compound, lanthanum source compound, aluminum source compound, titanium source compound, tantalum source compound, or combinations thereof, and the second salt group comprises lithium source compound; and performing an aerobic sintering process to form the solid-state electrolyte powder.

2. The method of claim 1, wherein the zirconium compound layer comprises zirconium dioxide, zirconium hydroxide, zirconium nitrate, zirconyl nitrate, zirconium hydrogen phosphate, zirconium tetrachloride, zirconium dichloride oxide, zirconium sulfate, or combinations thereof.

3. The method of claim 1, wherein forming the zirconium compound layer on the inner surface of the container comprises:

applying a zirconium compound coating on the inner surface of the container; and drying the zirconium compound coating to form the zirconium compound layer, wherein a drying temperature is between 40° C. and 120° C.

4. The method of claim 1, wherein a temperature of the aerobic sintering process is between 850° C. and 1280° C.

5. The method of claim 1, further comprising:

after performing the aerobic sintering process, performing a cleaning process to mix the solid-state electrolyte powder with a cleaning solution to form a mixed solution, wherein the cleaning solution comprises an acid and an alcohol; and separating the solid-state electrolyte powder from the mixed solution.

6. The method of claim 5, wherein the acid comprises an inorganic acid or an organic acid, the inorganic acid comprises hydrochloric acid, phosphoric acid, sulfuric acid, nitric acid, boric acid, or combinations thereof, and the organic acid comprises formic acid, acetic acid, or a combination thereof.

7. The method of claim 5, wherein the alcohol comprises methanol, ethanol, isopropanol, or combinations thereof.

8. The method of claim 5, wherein the acid is hydrochloric acid, the alcohol is ethanol, and a concentration of the hydrochloric acid in the cleaning solution is between 0.1 wt % and 30 wt %.

9. The method of claim 5, wherein a solid content of the solid-state electrolyte powder in the mixed solution is between 1% and 50%.

10. A method of forming a solid-state electrolyte powder, comprising:

performing an anaerobic sintering process on a precursor mixture to form a precursor, wherein the precursor mixture comprises a first salt group and a second salt group, the first salt group comprises zirconium source compound, lanthanum source compound, aluminum source compound, titanium source compound, tantalum source compound, or combinations thereof, and the second salt group comprises lithium source compound;

placing the precursor on a container;

after performing the anaerobic sintering process, performing an aerobic sintering process; and performing a cleaning process with a cleaning solution, wherein the cleaning solution comprises an acid and an alcohol.

11. The method of claim 10, wherein a temperature of the anaerobic sintering process is between 800° C. and 1100° C.

12. The method of claim 10, wherein a temperature of the anaerobic sintering process is lower than a temperature of the aerobic sintering process.

13. The method of claim 10, further comprising:

before placing the precursor mixture on the container, forming a zirconium compound layer on the container.

14. A method of forming a solid-state electrolyte powder, comprising:

forming a zirconium compound layer on an inner surface of a container, wherein a thickness of the zirconium compound layer is between 0.05 mm and 0.2 mm;

performing a grinding process on a precursor mixture, wherein the precursor mixture comprises a first salt group and a second salt group, the first salt group comprises zirconium source compound, lanthanum source compound, aluminum source compound, titanium source compound, tantalum source compound, or combinations thereof, and the second salt group comprises lithium source compound;

after performing the grinding process, placing the precursor mixture on the zirconium compound layer; and performing a sintering process.

15. The method of claim 14, wherein, based on 100 wt % of the precursor mixture, the first salt group is between 70 wt % and 78 wt %, and the second salt group is between 22 wt % and 30 wt %.

16. The method of claim 14, wherein performing the grinding process comprises:

grinding the first salt group;

after grinding the first salt group, mixing the first salt group and the second salt group; and grinding the first salt group and the second salt group.

17. The method of claim 14, further comprising:

after performing the sintering process, performing a cleaning process with a solution of hydrochloric acid and an alcohol.

18. The method of claim 14, wherein performing the sintering process comprises performing an anaerobic sintering process and performing an aerobic sintering process.

* * * * *